(12) United States Patent
Ou-Young

(10) Patent No.: US 6,251,462 B1
(45) Date of Patent: Jun. 26, 2001

(54) METHOD OF SHAPING A SPHERICAL BODY

(76) Inventor: Robert Ou-Young, 5F, No. 52, Lane 148, Li-De Street, Chung Ho City, Taipei Hsien (TW)

( * ) Notice: Subject to any disclaimer, the term of this patent is extended or adjusted under 35 U.S.C. 154(b) by 0 days.

(21) Appl. No.: 09/753,952

(22) Filed: Jan. 2, 2001

Related U.S. Application Data

(62) Division of application No. 09/505,479, filed on Feb. 18, 2000.

(51) Int. Cl.[7] ............................................. A21D 6/00
(52) U.S. Cl. ............................ 426/503; 426/283; 426/512
(58) Field of Search ..................... 426/297, 283, 426/284, 496, 503, 512; 425/132, 142, 308, 466

(56) References Cited

U.S. PATENT DOCUMENTS

| | | | |
|---|---|---|---|
| 4,882,185 | * 11/1989 | Simelunas et al. | 426/283 |
| 5,518,391 | * 5/1996 | Tashiro | 426/503 |

* cited by examiner

*Primary Examiner*—George C. Yeung
(74) *Attorney, Agent, or Firm*—Pro-Techtor International Services

(57) ABSTRACT

A method of shaping a spherical body composed of an outer covering layer and an inner filling, comprising a holder frame, a rotary wheel rotated forwards and backwards alternatively in the holder frame, and triangular cutter members coupled to the rotary wheel and arranged in sliding contact with each other and moved with the rotary wheel between a first position to form a center opening for the passing of a continuously fed cylindrical body consisting of dough crust and a filling, and a second position to shape a spherical body consisting of dough crust and a filling from the continuously fed cylindrical body.

3 Claims, 17 Drawing Sheets

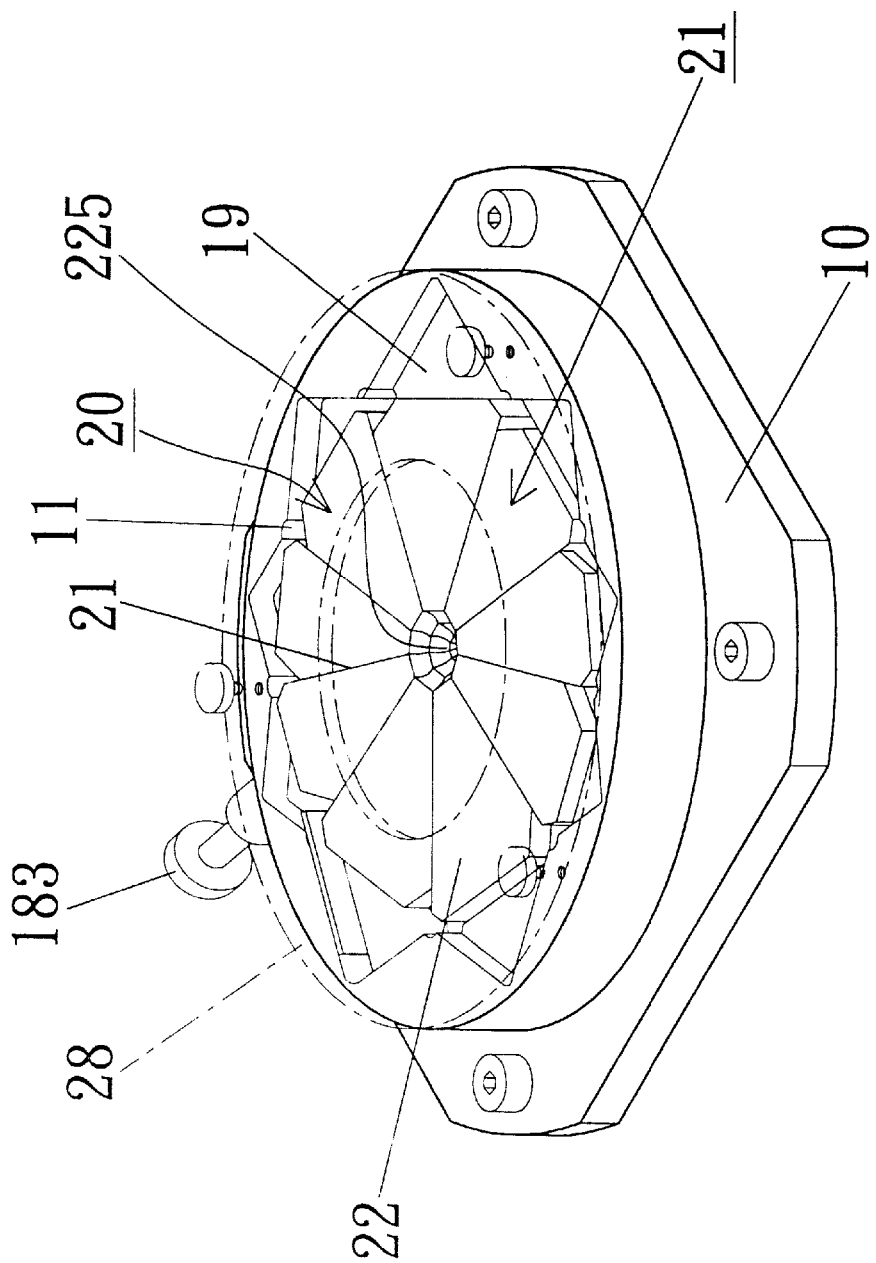
FIG:1

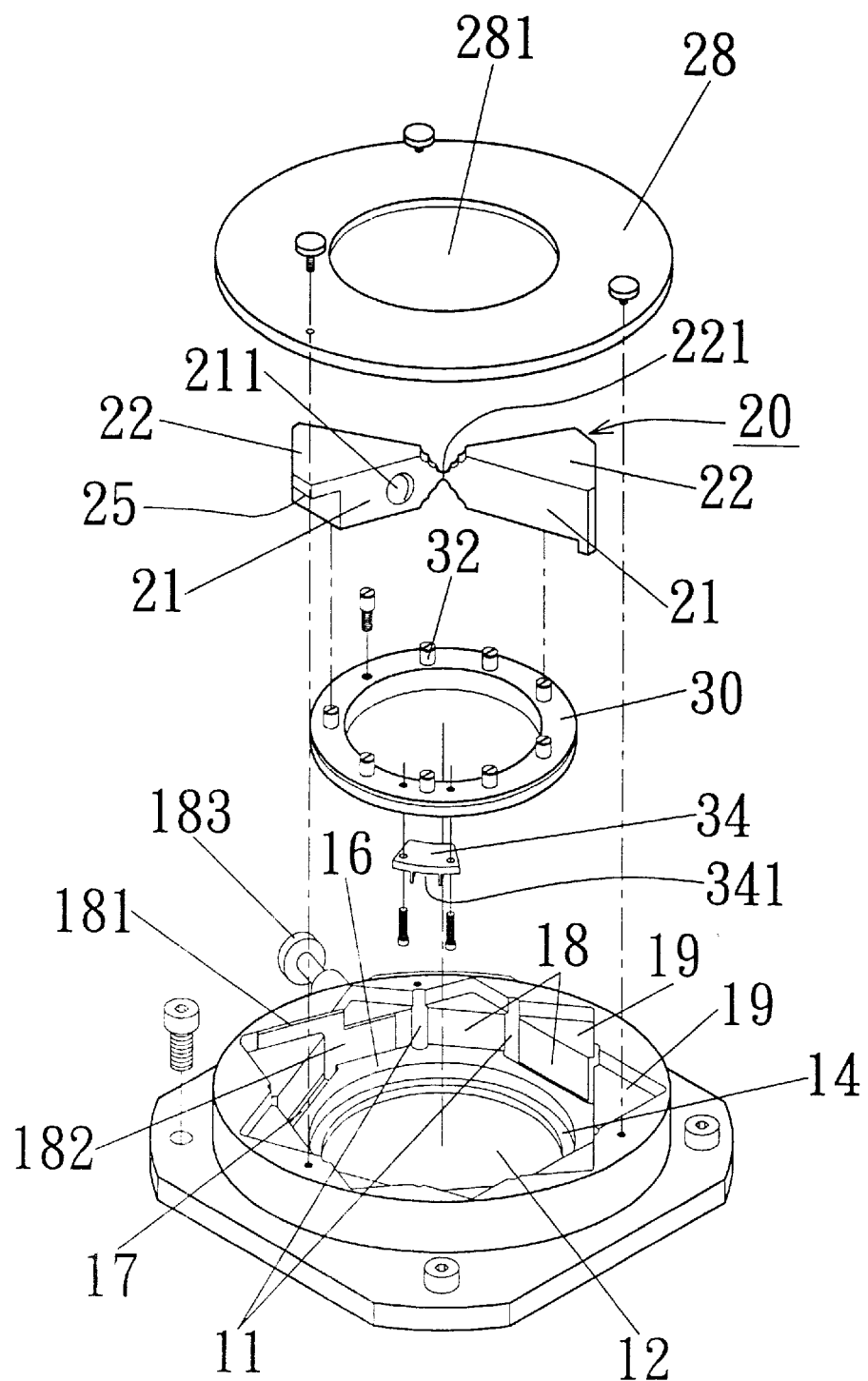
FIG:2

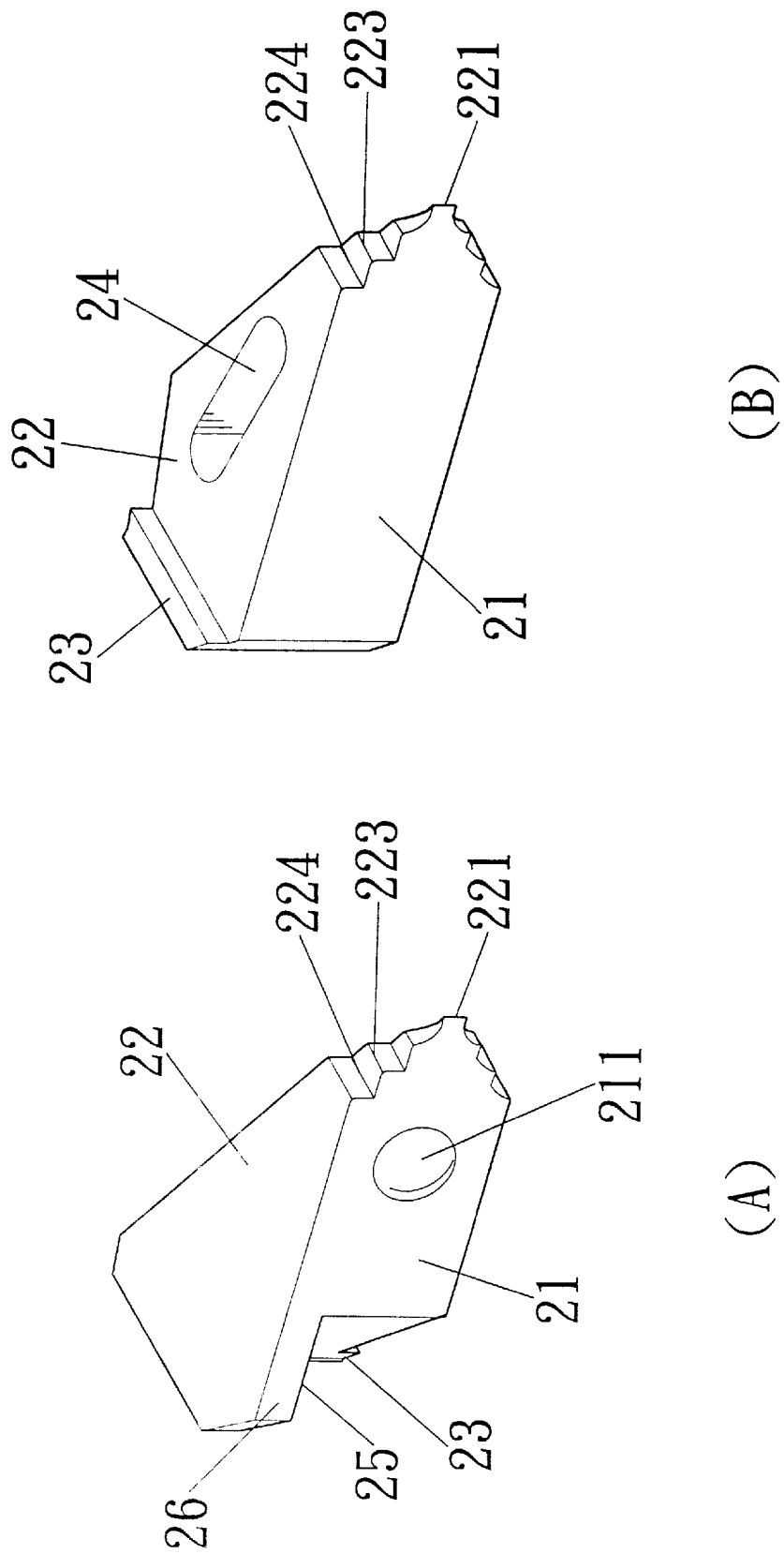
FIG:3

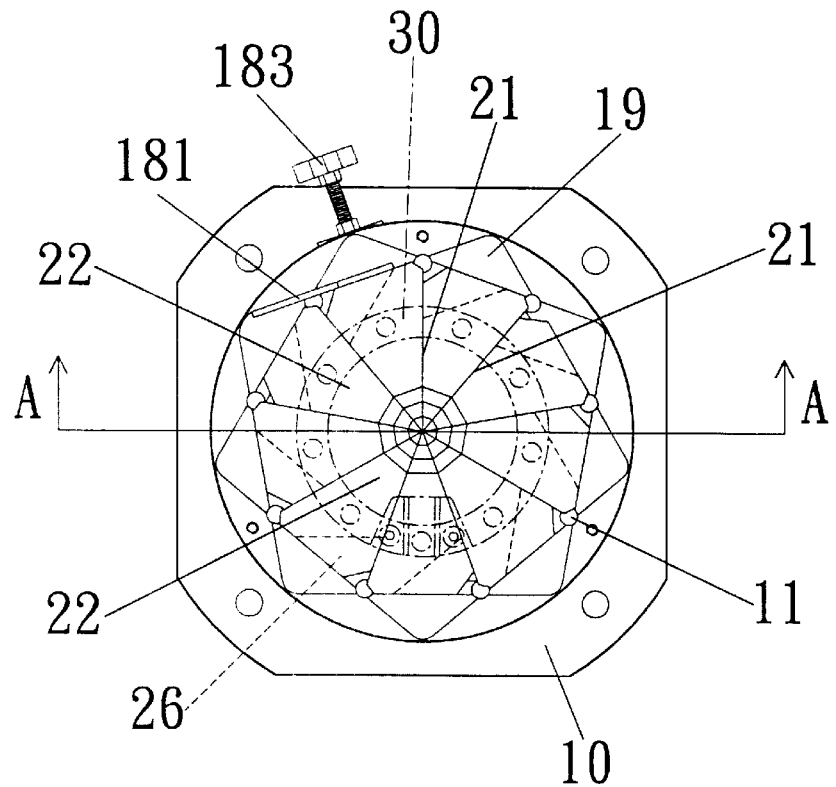
FIG:4
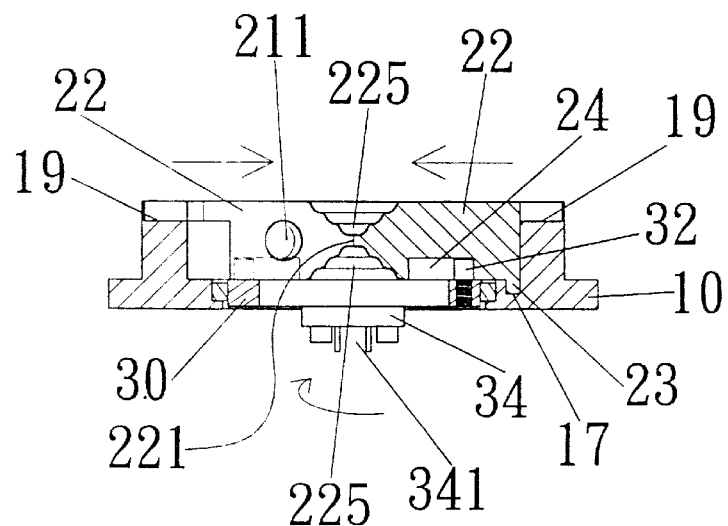
FIG:5

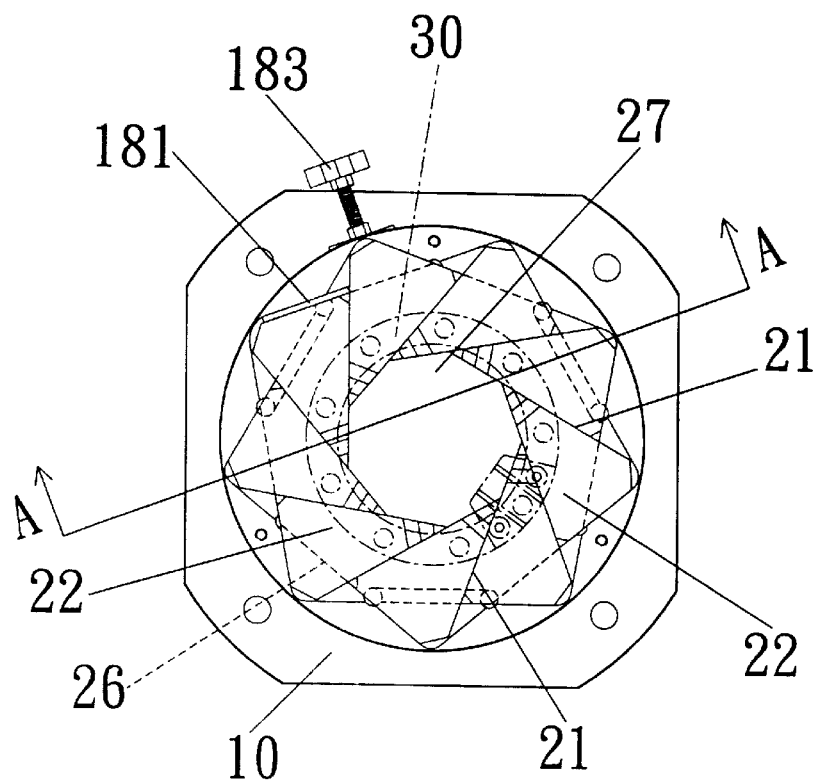
FIG:6
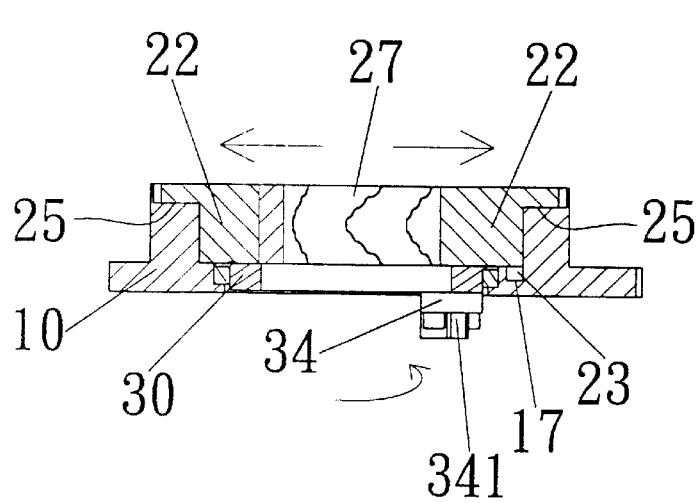
FIG:7

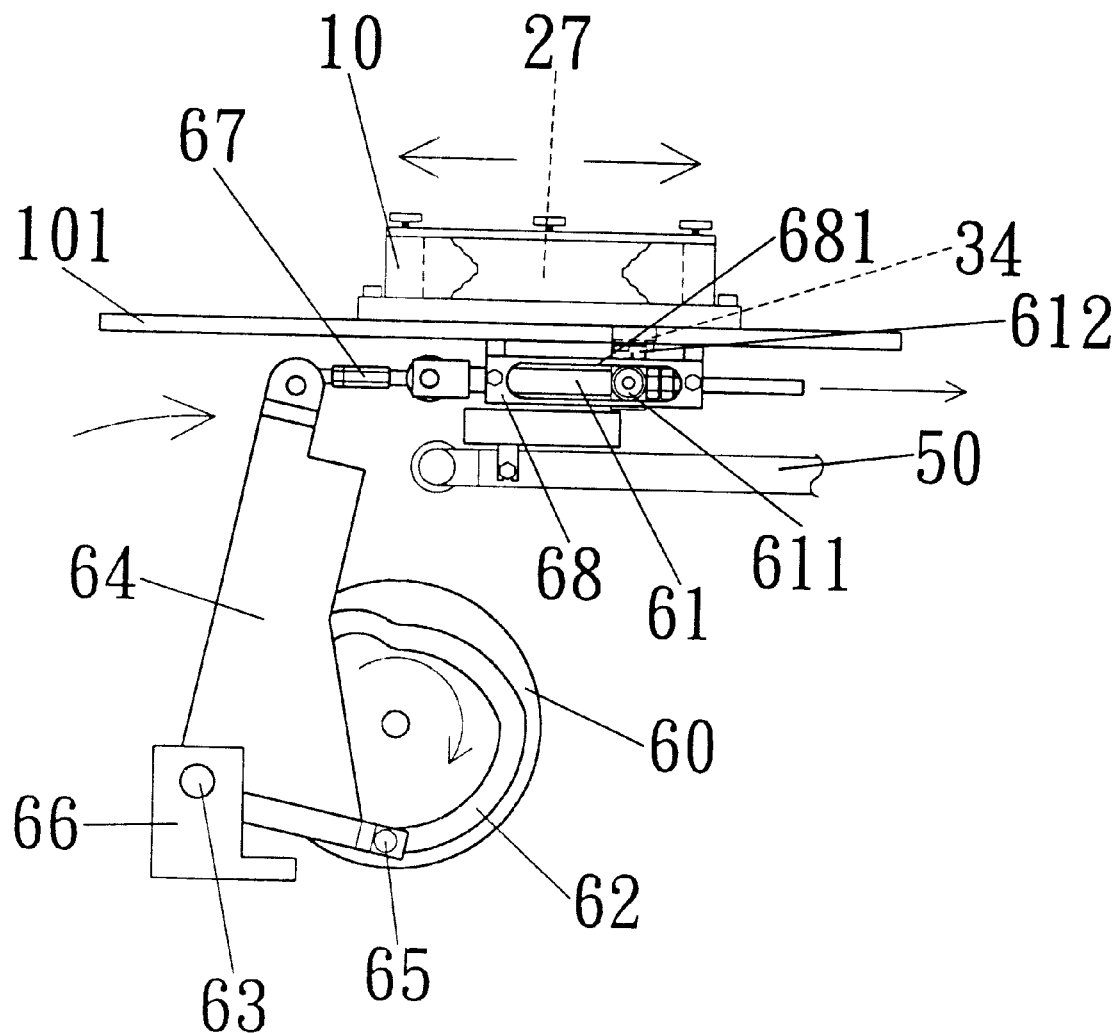
FIG:8

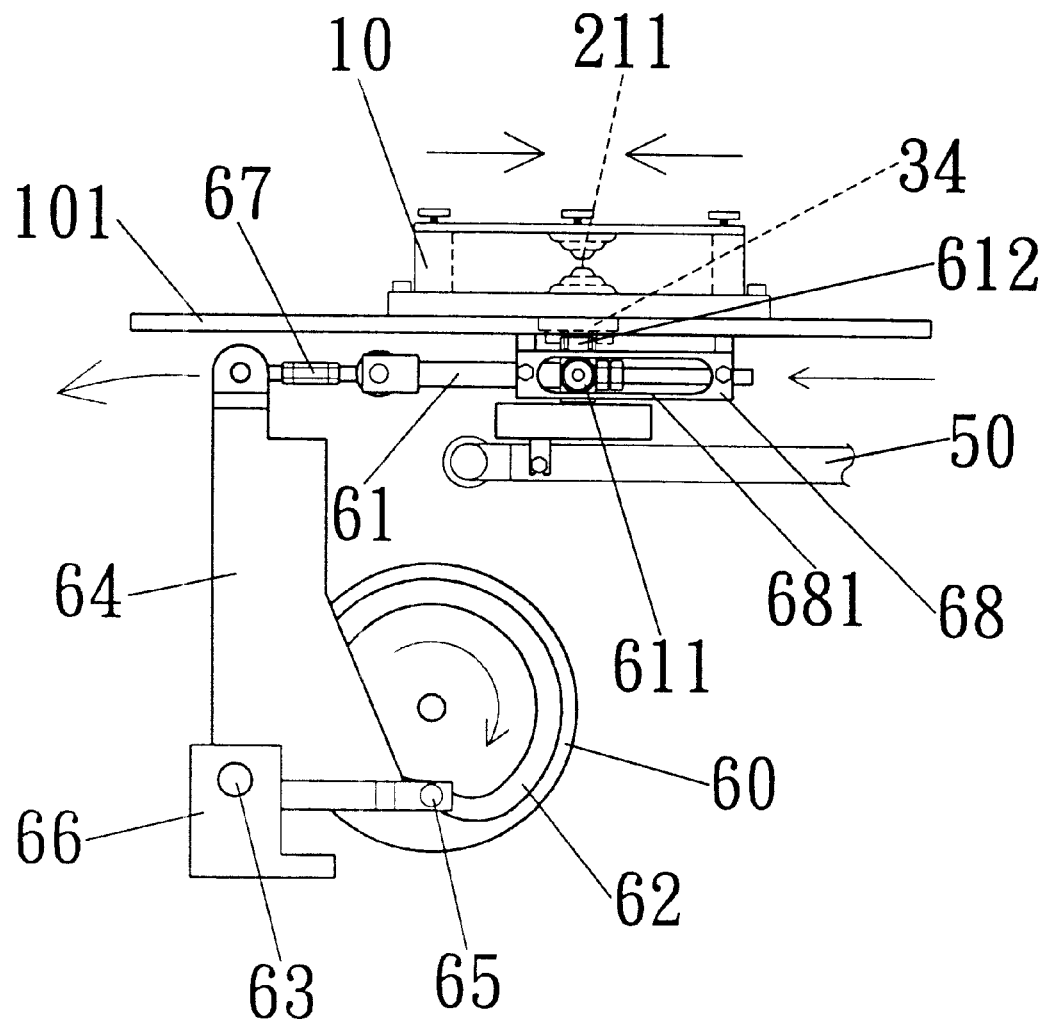
FIG:9

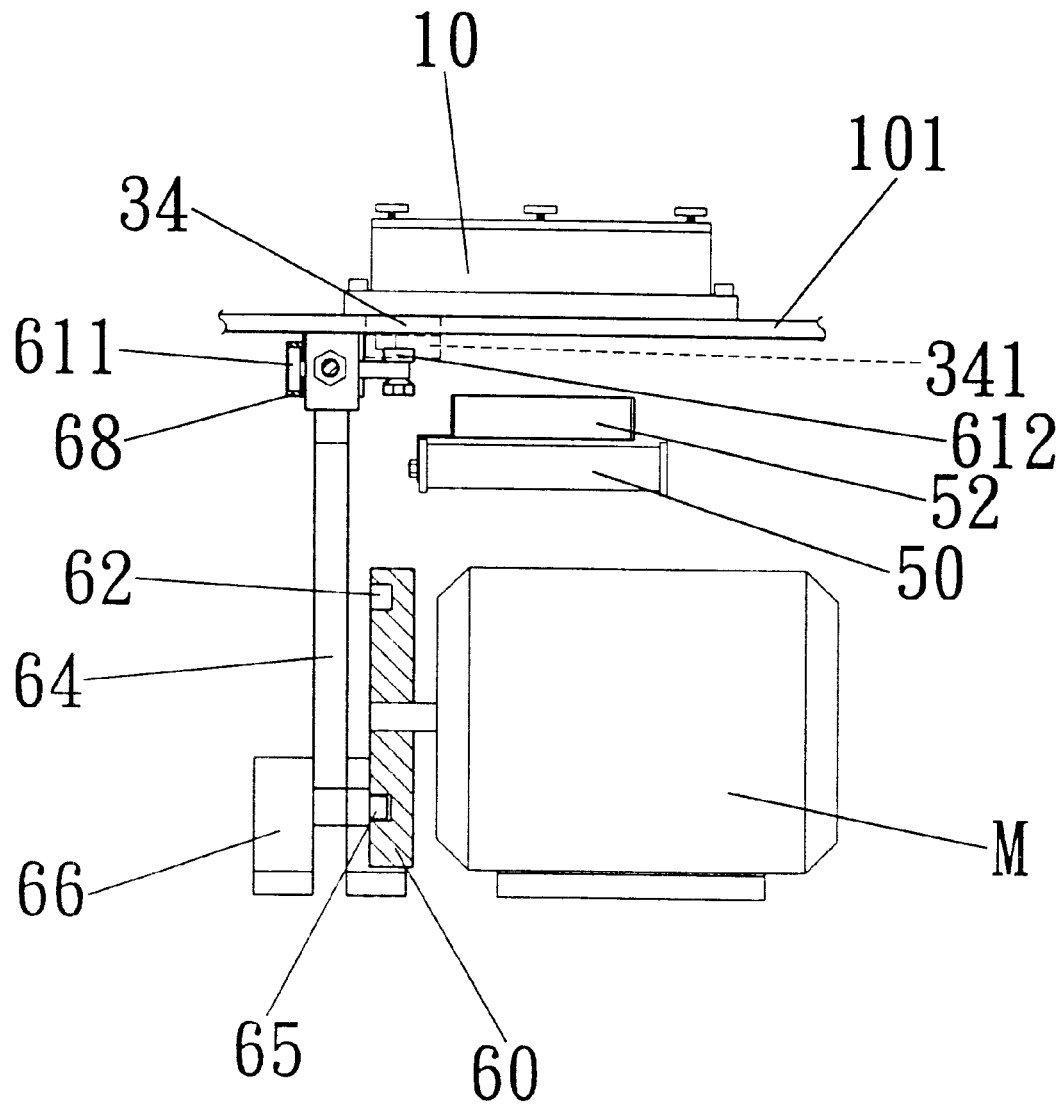
FIG:10

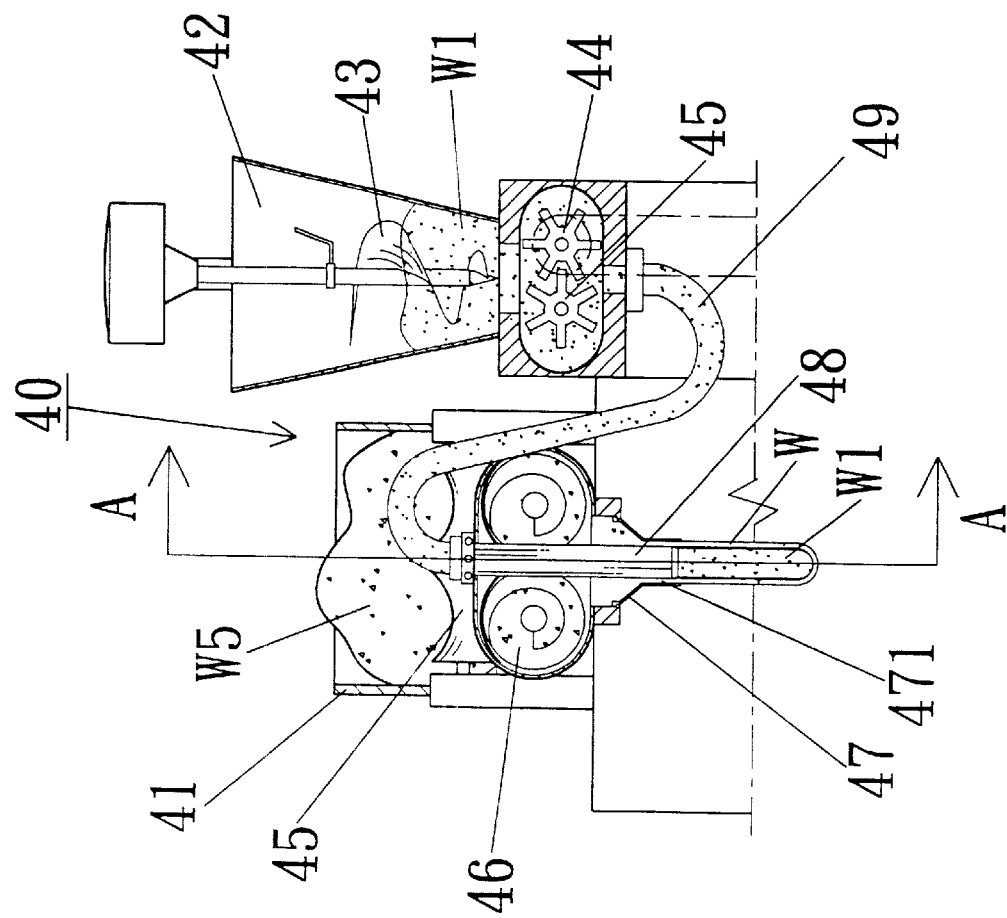
FIG:11

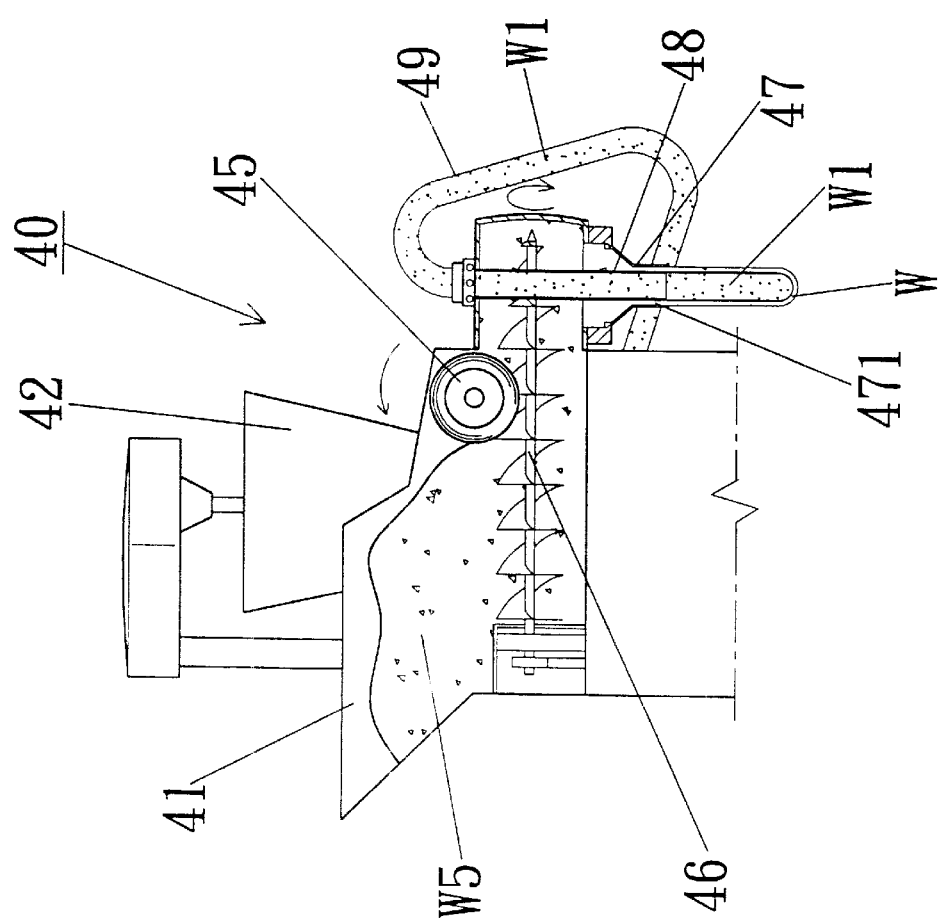
FIG:12

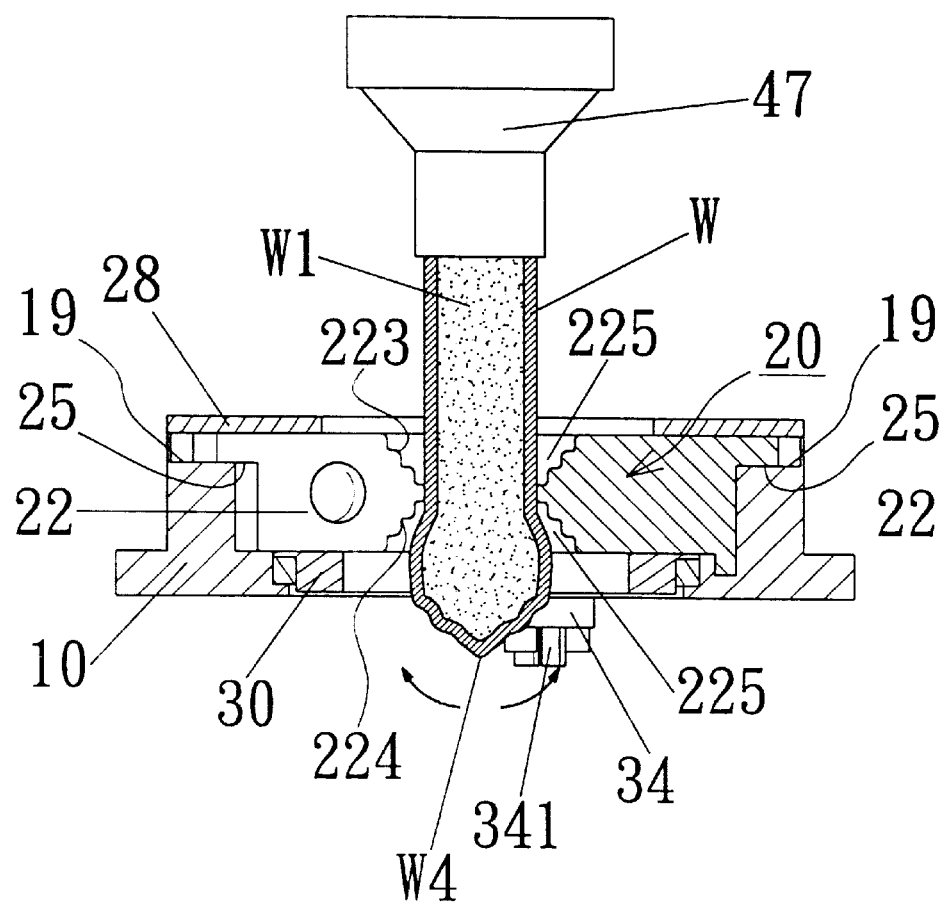
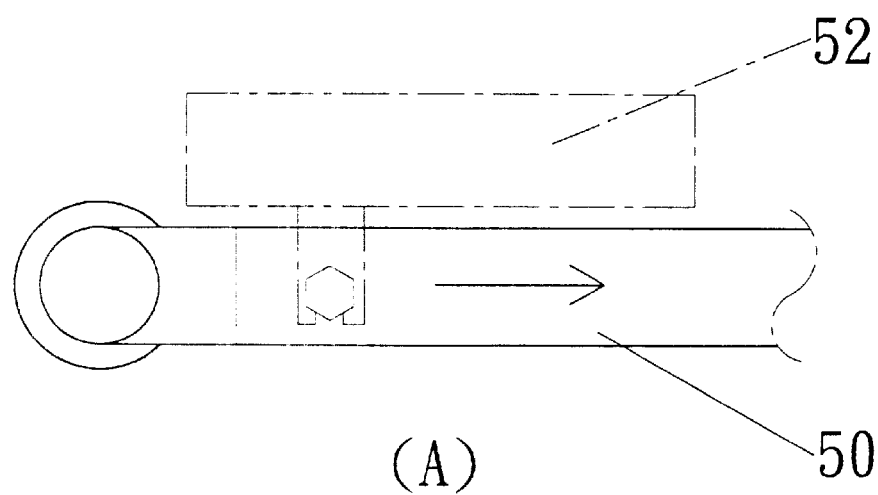
FIG:13

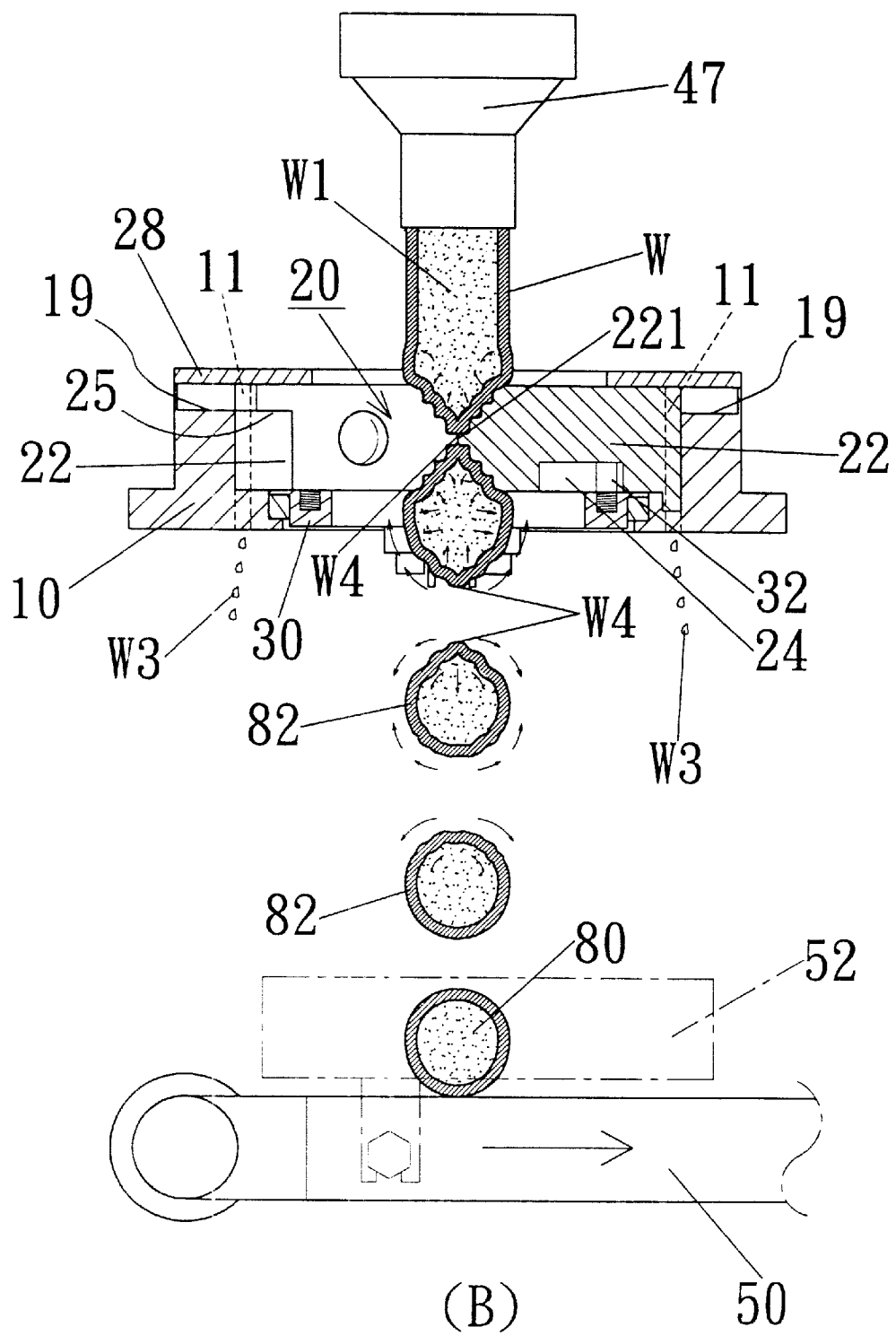
FIG:14

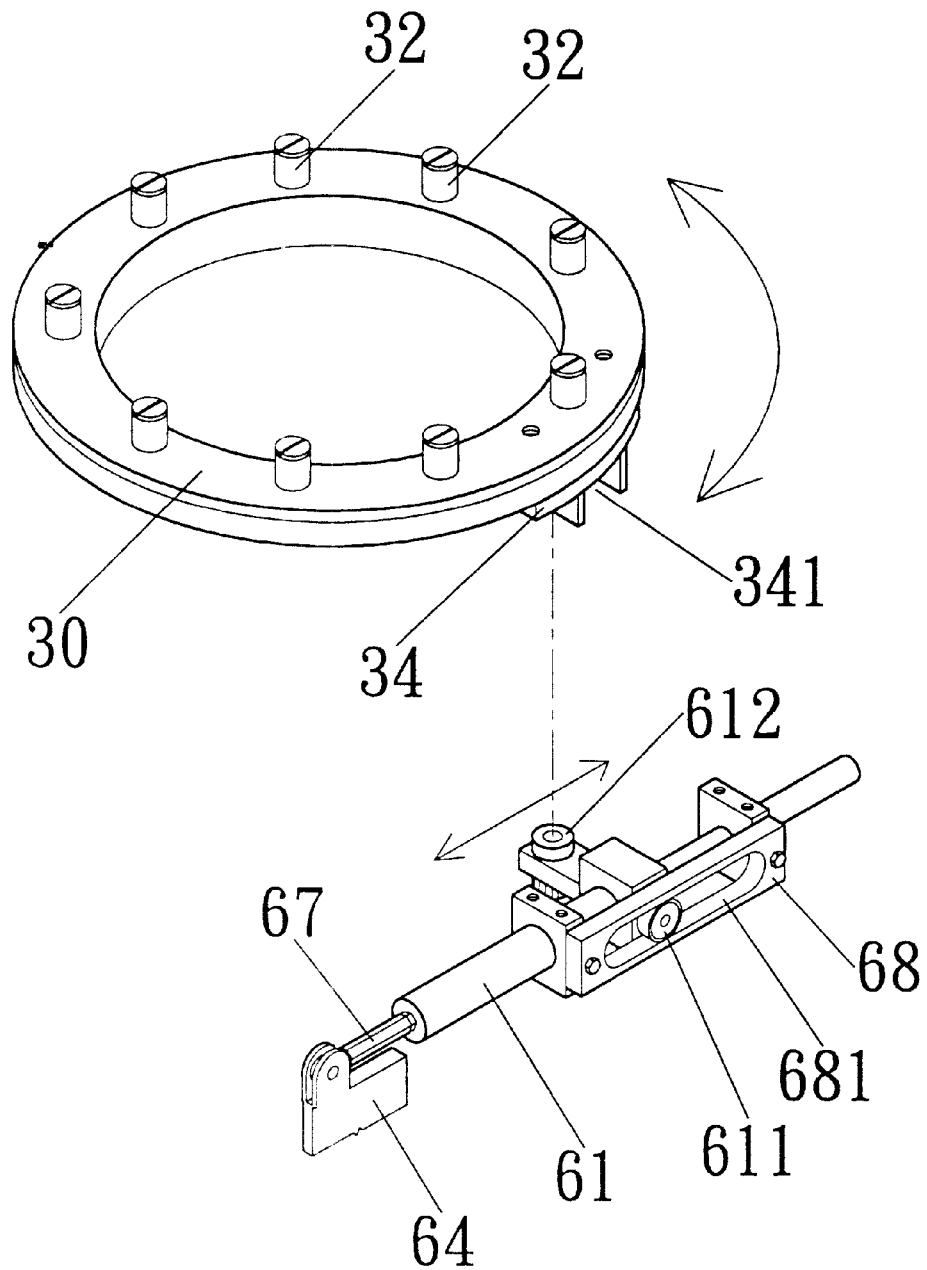
FIG:15

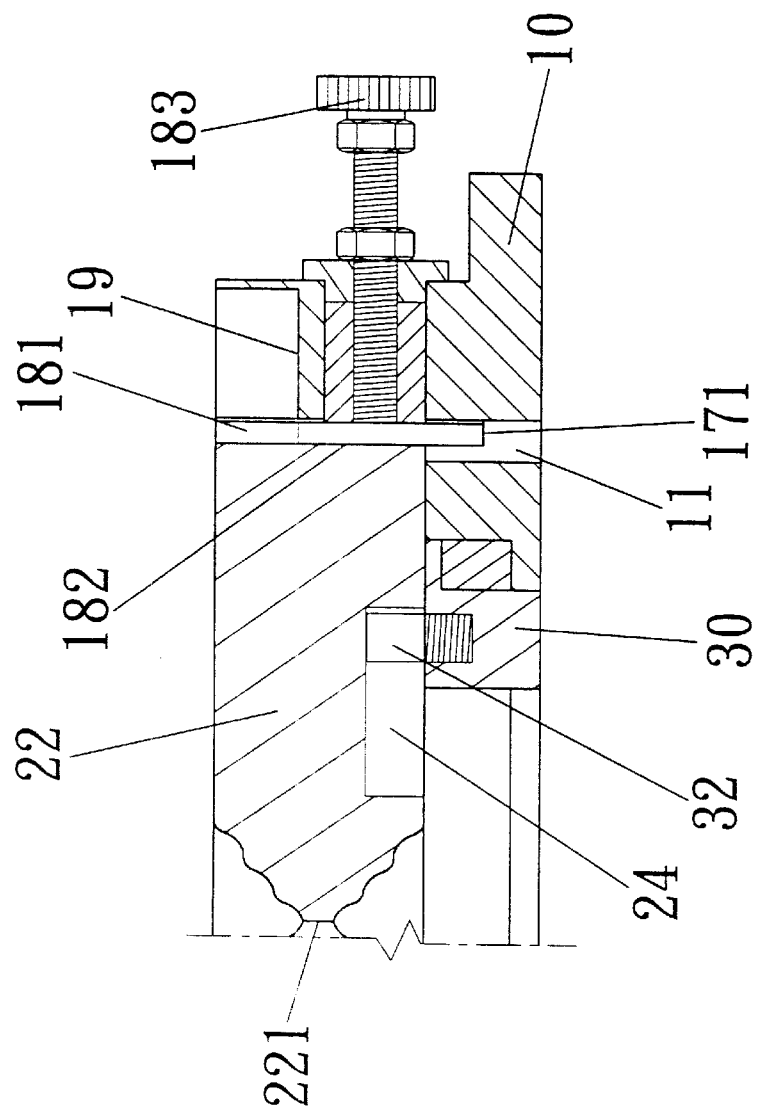
FIG:16

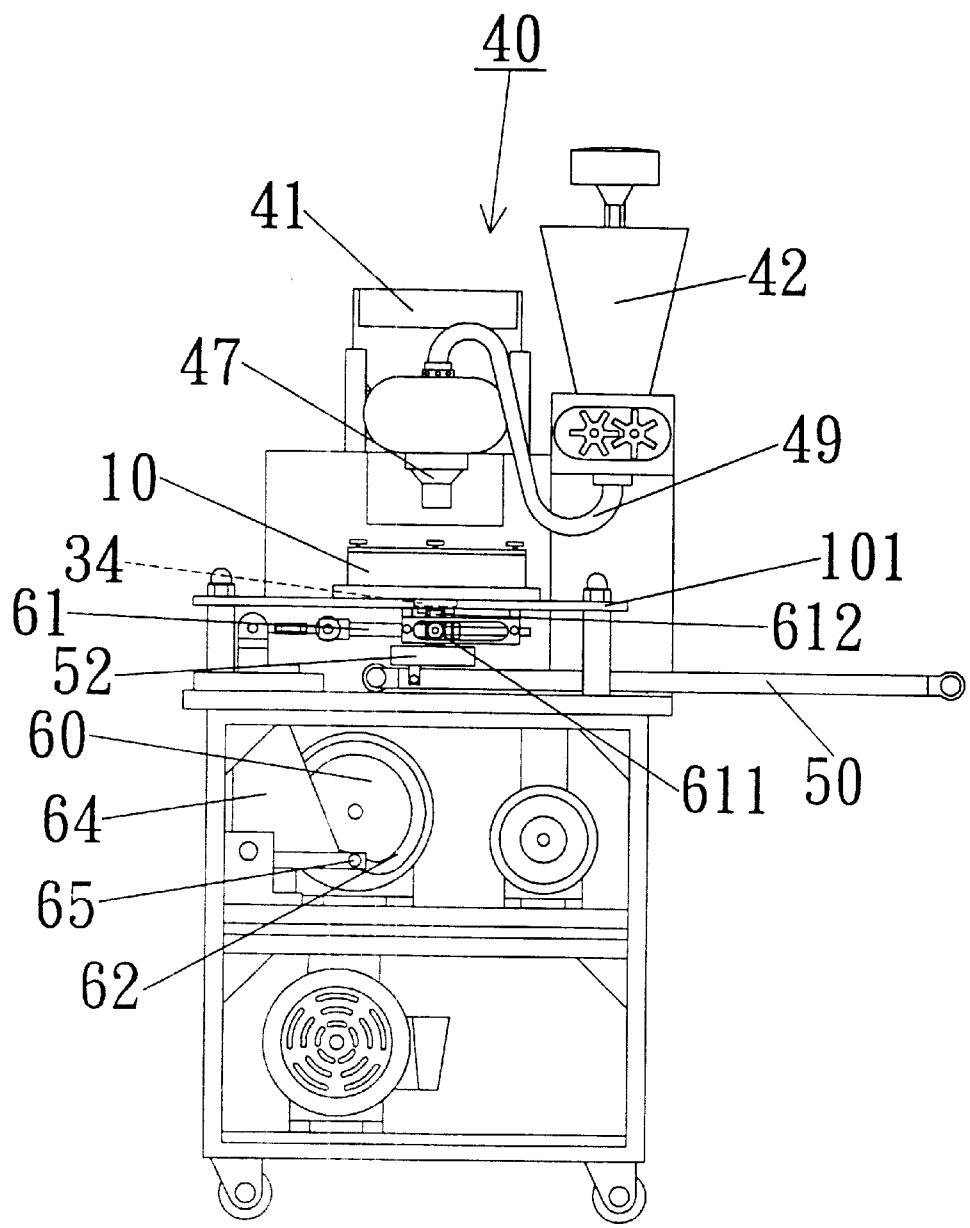
FIG:18

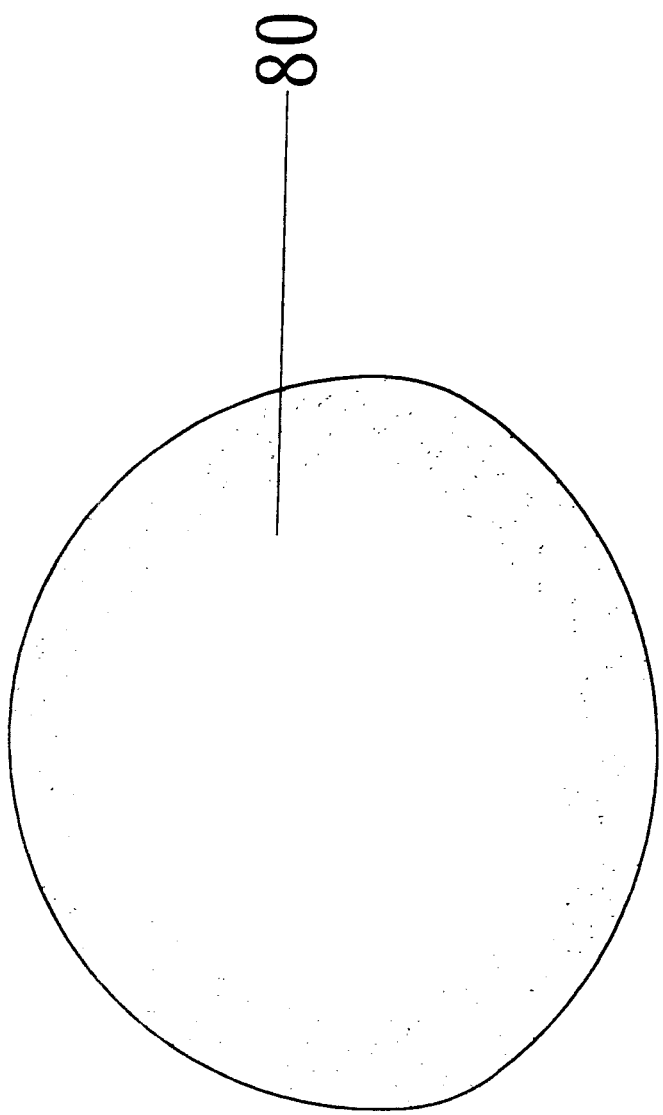
FIG:19

METHOD OF SHAPING A SPHERICAL BODY

This is a divisional application of applicant's U.S. patent application Ser. No. 09/505,479, filed on Feb. 18, 2000.

BACKGROUND OF THE INVENTION

The present invention relates to a method of shaping a spherical body from a continuously fed cylindrical body consisting dough crust and a filling. The invention relates also to the apparatus for shaping a spherical body from a continuously fed cylindrical body.

Japanese Utility Model Publication No. 60-85178 (issued on Jun. 12, 1985) discloses a cutter assembly comprising a plurality of shutters in a guide and means to slide the shutters whereby bar foodstuffs are cut. The shutters each have two sliding faces. When one shutter is moved, the other shutters are forced against one another, causing the shutters to form a center opening or close it.

U.S. Pat. No. 4,883,678 discloses a method for shaping a spherical body consisting of dough crust and filling, in which a continuously fed cylindrical body, consisting of dough crust and a filling, is constricted by at least three sliding members which form an opening or closes it. The members slide one each other so as to constrict the cylindrical body. U.S. Pat. Nos. 4,734,024 and 4,767,304 disclose similar apparatus for shaping a spherical body. The apparatus comprises at least three sliding members which form The apparatus comprises at least three sliding members which form an opening or closes it.

According to the aforesaid prior art designs, and one sliding member is driven to move the other sliding members, so as to form an opening or to close the opening. Because the sliding members are not simultaneously moved by a driving mechanism, less force is received by the last sliding member, causing the sliding members unable to accurately cut off the leading part of the continuously fed cylindrical body. When a spherical body is formed from the continuously fed cylindrical body, the filling may leak out of the spherical body. According to FIGS. 18 and 19 of U.S. Pat. No. 4,767,304, two pins 99, 100 fixed to the sliders are provided and connected to a pair of the members in order to facilitate the sliding operation. However, because the inner sliding surfaces of the sliding members rub against one another during the sliding operation, the sliding members wear quickly with use. When the sliding members start to wear, they cannot positively cut off the continuously fed cylindrical body.

SUMMARY OF THE INVENTION

The present invention has been accomplished to provide a spherical body shape forming apparatus, which eliminates the drawbacks of the prior art designs. It is one object of the present invention to provide a spherical body shape forming apparatus, which positively simultaneously drives cutter members between two positions to form a center opening or close it. It is another object of the present invention to provide a spherical body shape forming apparatus, which drives cutter members to achieve a long stroke for cutting a big diameter of cylindrical body consisting of dough crust of a filling. It is another object of the present invention to provide a spherical body shape forming apparatus, which has conveyer means to carry the shape formed spherical body to a spherical body collector, and fender means to stop the shape formed spherical body from falling out of the conveyer. It is still another object of the present invention to provide a spherical body shape forming apparatus, which has means to receive residual dough crust and to guide residual dough crust out of the apparatus, enabling the cutter members to be moved smoothly between the close position and the open position. According to one aspect of the present invention, the apparatus comprises a holder frame, the holder frame comprising a center opening, an annular groove around the center opening, a bearing portion around the annular groove for receiving a cutter assembly, a plurality of vertical sliding contact walls disposed at different angles around the bearing portion and equiangularly spaced from one another, and a plurality of triangular recesses respectively formed on a top side wall thereof corresponding to the vertical sliding contact walls; an annular rotary wheel mounted in the holder frame and rotated clockwise and counter-clockwise alternatively within a limited angle in the annular groove, the annular rotary wheel comprising a plurality of upright pegs equiangularly spaced at a top sidewall thereof; a cutter assembly coupled to the rotary wheel, the cutter assembly comprising a plurality of triangular cutter members respectively mounted on the upright wheel and arranged in sliding contact with each other and moved with the rotary wheel between a first position where the cutter members form a center opening, and a second position where the center opening is closed, the cutter members each comprising an elongated, recessed bottom sliding coupling hole respectively coupled to the upright pegs of the rotary wheel, an angled notch at a rear side, and a rear protruding portion above the angled notch; and a material feeder controlled to feed a cylindrical body consisting of a dough crust covering layer and a filling, for enabling the cylindrical body to be cut and shaped into a spherical body by the cutter members upon each clockwise and counter-clock wise alternative rotation cycle of the annular wheel. According to another aspect of the present invention, the holder frame further comprises at least one sliding slot respectively disposed between the vertical sliding bearing walls and the bearing portion, and the cutter members of the cutter assembly include at least one having a bottom locating flange respectively coupled to the at least one sliding slot in the holder frame. According to still another aspect of the present invention the holder frame further comprises a metal pressure plate covered on one vertical sliding contact wall, and an adjustment screw stopped at the metal pressure plate against the cutter assembly and rotated to move the metal pressure plate relative to the cutter assembly. According to still another aspect of the present invention, the holder frame further comprises a plurality of vertical slots respectively disposed between each two adjacent vertical sliding contact walls, and the cutter members each further comprise a receiving hole on one vertical sidewall for receiving residual dough crust, enabling residual dough crust to fall out of the holder frame through the vertical slot between each two adjacent vertical sliding contact walls. According to still another aspect of the present invention, the cutter members each further comprise a front cutting edge formed of two symmetrical, vertically spaced sets of nosings and treads. According to still another aspect of the present invention, a conveyer is spaced below the center opening of the holder frame and for carrying produced spherical body to a spherical body collector, and a C-shaped fender is provided to stop produced spherical body from falling out of the conveyer.

BRIEF DESCRIPTION OF THE DRAWINGS

FIG. 1 is a perspective view of a part of the present invention, showing the cutter assembly installed in the rotary wheel inside the holder frame.

FIG. 2 is an exploded view of FIG. 2.

FIG. 3A is an oblique top elevation of one cutter member according to the present invention.

FIG. 3B is an oblique bottom elevation of the cutter member shown in FIG. 3A.

FIG. 4 is a top plain view of a part of the present invention, showing the cutter assembly closed.

FIG. 5 is a sectional view taken along line A—A of FIG. 4.

FIG. 6 is similar to FIG. 4 but showing the cutter assembly opened.

FIG. 7 is a sectional view taken along line A—A of FIG. 6.

FIG. 8 is a side plain view of a part of the present invention, showing the cam rotated, the cutter assembly opened.

FIG. 9 is similar to FIG. 8 but showing the cutter assembly closed.

FIG. 10 is another side plain view of the present invention when viewed from another side.

FIG. 11 is a sectional front view of the material feeder according to the present invention.

FIG. 12 is a sectional view taken along line A—A of FIG. 11.

FIG. 13 is a sectional view in an enlarged scale of a part of the present invention, showing the spherical body shaping operation of the cutter assembly (STEP I).

FIG. 14 is a sectional view in an enlarged scale of a part of the present invention, showing the spherical body shaping operation of the cutter assembly (STEP III).

FIG. 15 is an exploded view in an enlarged scale of a part of the present invention, showing the relationship between the rotary wheel and the linking mechanism of the first link and second link.

FIG. 16 is a sectional view in an enlarged scale of a part of the present invention, showing the adjustment screw stopped at the metal pressure plate.

FIG. 18 is a front view of the spherical body shape forming apparatus according to the present invention.

FIG. 19 illustrates a spherical body produced according to the present invention.

DETAILED DESCRIPTION OF THE PREFERRED EMBODIMENT

Figure 17:
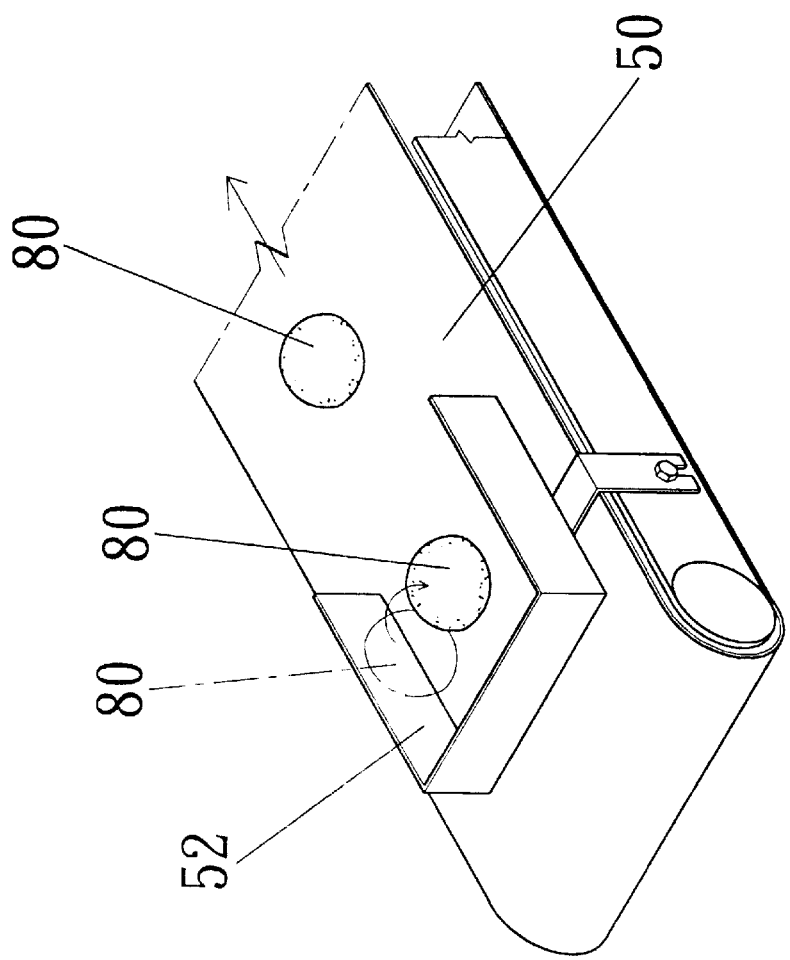
FIG. 17 is a perspective view in an enlarged scale of a part of the present invention, showing the relationship between the C-shaped fender and the conveyer.

Referring to FIGS. 1, 2 and 18, a spherical body shape forming apparatus is shown comprised of a holder frame 10, a rotary wheel 30, a cutter assembly 20, and a material feeder 40.

The holder frame 10 comprises a center opening 12 an annular groove 14 around the center opening 12. a bearing portion 16 around the annular groove 14 for receiving the cutter assembly 20, a plurality of vertical sliding contact walls 18 disposed at different angles around the bearing portion 16 and equiangularly spaced from one another, and a plurality of triangular recesses 19 respectively formed on the top side wall thereof corresponding to the vertical sliding contact walls 18. The rotary wheel 30 is an annular wheel mounted in the holder frame 10 and rotated clockwise/counter-clockwise in the annular groove 14, comprising a plurality of upright pegs 32 equiangularly spaced at the top sidewall thereof. The cutter assembly 20 comprises a plurality of triangular cutter members 22 respectively mounted on the rotary wheel 30. Each cutter member 22 comprises an elongated, recessed bottom sliding coupling hole 24 coupled to one upright peg 32 at the rotary wheel 30 (see FIG. 5), an angled notch 25 at the rear side thereof. After installation of the cutter members 22 in the rotary wheel 30, the sliding members 22 are arranged in sliding contact with each other so as to form a center opening 27, which is openable and closable (see FIGS. 6 and 7). The material feeder 40 is controlled to feed a cylindrical body W consisting of dough crust and a filling W1 in dough crust (see FIG. 12).

The holder frame 10 comprises at least one sliding slot 17 respectively disposed between the vertical sliding bearing walls 18 and the bearing portion 16. At least one cutter member 22 of the cutter assembly 20 has a locating flange 23 formed integral with the bottom sidewall thereof at the rear side, and respectively slidably coupled to the at least one sliding slot 17 in the holder frame 10.

A metal pressure plate 181 is covered on one vertical sliding contact wall 18 in the holder frame 10. An adjustment screw 183 is installed in the holder frame 10 and stopped against the metal pressure plate 181 (see FIG. 16). By means of rotating the adjustment screw 183, the metal pressure. plate 181 is forced against the cutter assembly 20, preventing a gap between corresponding vertical sidewalls 21 of two adjacent cutter members 22 of the cutter assembly 20.

A cover plate 28 is fastened to the holder frame 10 to limit upward movement of the cutter assembly 20. The cover plate 28 comprises a circular center opening 281 (see FIG. 2).

Each cutter member 22 has a receiving hole 211 on one vertical sidewall 21. A vertical slot 11 is formed in the holder frame 10 between each two adjacent vertical sliding contact walls 18. Upon each cycle of closing and opening operation of the cutter assembly 20 to cut off the leading part of the cylindrical body W, residual dough crust W3 is moved into the receiving hole 211 on each cutter member 22 and forced out of the holder frame 10 through the vertical slot 11 between each two adjacent vertical sliding contact walls 18.

Each cutter member 22 has a front cutting edge 221 formed of two symmetrical. vertically spaced sets of nosings 223 and treads 224 (see FIG. 3).

A conveyer 50 is disposed between the center opening 27 formed in the sliding members 22, and a C-shaped fender 52 is suspended between the holder frame 10 and the conveyer 50 (see FIG. 10). The holder frame 10 is fixedly mounted on a table 101 (see FIGS. 8, 9, and 10).

Referring to FIG. 15 and FIGS. from 8 through 10, a motor M is mounted below the conveyer 50, and controlled to rotate a cam 60. The cam 60 has a curved guide groove 62 on one sidewall thereof. A fixed block 66 is spaced below the table 101 adjacent to the cam 60. A crank 64 is provided having one corner of a bottom end thereof pivoted to the fixed block 66 by a pivot 63, the other corner of the bottom end mounted with a roller 65 coupled to the curved guide groove 62, and a top end pivoted to a first link 67. A locating plate 68 is fixedly fastened to the table 101 at a bottom side, having a longitudinal sliding slot 681. A second link 61 is coupled to the first link 67, and mounted with a side roller 611, which is slidably coupled to the longitudinal sliding slot 681 in the locating plate 68, and a top roller 612, which is slidably coupled to a channel 341 in a transverse guide plate 34 at the bottom side of the rotary wheel 30. When the cam 60 is rotated by the motor M, the side roller 611 is moved with the second link 61 back and forth along the longitudinal sliding slot 681 in the locating plate 68, and at the same time the top roller 612 is moved with the second link 61 in the channel 341 in the guide plate 34, causing the rotary wheel 30 to be rotated alternatively forwards and backwards within a limited angle, and therefore the cutter members 22 are moved to close and open the center opening 27 alternatively.

Referring to FIGS. 11 and 12, the material feeder 40 comprises a dough crust supply container 41, and a filling supply container 42. The filling supply container 42 has propelling blades 43, 44 and 45 on the inside. The dough crust supply container 41 comprises a plurality of guide rollers 45 and 46 installed on the inside, an output hopper 47 at the output end thereof, and a nozzle tube 48 suspended in the hopper 47 and defining with the output hopper 47 an tubular passage 471. The nozzle tube 48 has a top end connected to the output end of the filling supply container 42 by a hose 49. When dough crust W5 passes through the tubular passage 471, it forms with the continuously supplied filling W1 a cylindrical body W.

As indicated above, the cutter members 22 of the cutter assembly 20 are respectively slidably coupled to the upright pegs 32 of the rotary wheel 30 in the holder frame 10. When the rotary wheel 30 is rotated, the cutter members 2 are moved to close and open the center opening 27 alternatively. When the center opening 27 is fully opened, the rear-protruding portion 26 of each cutter member 22 is respectively received in the triangular recesses 19, and at the same time the cylindrical body W is delivered through the center opening 27. When the front cutting edges 221 of the cutter members 22 are respectively forced into contact with each other to close the center opening 27, the leading part of the cylindrical body W is cut off, forming a spherical body 80. When the cutter assembly 20 is closed, the front cutting edges 221 of the cutter members 22 are attached to one another, two stepped, tapered spaces 225 are respectively defined at top and bottom sides of the abutted front cutting edges 221 of the cutter members 22 to receive the leading part of the cut cylindrical body W and the cutting side W4 of the spherical body 80 (see FIG. 14), enabling the filling W1 to be respectively forced upwards and received inside the dough crust of the cut cylindrical body W, or forced downwards and received inside the dough crust covering layer 82 of the spherical body 80. When the cutter assembly 20 is driven to close/open the center opening 27, the locating flange 23 is moved with the respective cutter member 22 in the corresponding sliding slot 17 (see FIGS. 5 and 7), keeping the cutter assembly 20 in a balanced manner during its operation.

As indicated above, the upright pegs 32 of the rotary wheel 30 are respectively coupled to the bottom sliding coupling hole 24 on each cutter member 22 (see FIG. 3B, and the top roller 612 is coupled to the channel 341 in the guide plate 34 (see FIG. 15). When the motor M is started to rotate the cam 60, the crank 64 is turned back and forth about the pivot 63, causing the second link 61 to be reciprocated. During reciprocating of the second link 61, the side roller 611 is moved in the longitudinal sliding slot 681 in the locating plate 68, and the top roller 612 is moved in the channel 341 in the guide plate 34, and therefore the rotary wheel 30 is rotated clockwise and counter-clockwise alternatively in the annular groove 14 inside the holder frame 10 within a limited angle. When the upright pegs 32 are moved counter-clockwise in the bottom sliding coupling hole 24 on each cutter member 22, the cutter members 20 are respectively moved toward each other, to force the respective front cutting edges 221 toward the center of the rotary wheel 30, and to close the center opening 27 (see FIGS. 4 and 5. When the cutter members 22 are moved to the closed position to close the center opening 27, the rear-protruding portion 26 of each cutter member 22 is moved out of the corresponding triangular recess 19. After the rear protruding portion 26 of each cutter member 22 has been separated from the corresponding triangular recess 19, each cutter member 22 is allowed to be turned about the corresponding upright peg 32, so as to cut off the highly flexible dough crust of the cylindrical body W, enabling a spherical body 80 to be produced (see FIG. 19). Because the cutter members 22 can be turned about the respective upright pegs 32 to cut the cylindrical body W after having been moved out of the respective triangular recesses 19, less rubbing force is produced between the sidewalls 21 of each two adjacent cutter members 22. Therefore, the cutter assembly 20 is durable in use.

Referring to FIGS. 2, 3 and 14, when a spherical body 80 is produced, the receiving hole 211 on each cutter member 22 receives residual dough crust W3, enabling residual dough crust W3 to fall out of the holder frame 10 through the vertical slot 11 between each two adjacent vertical sliding contact walls 18. This design eliminates adhesion of residual dough crust to the vertical sidewalls 21 of the cutter members 22, enabling the cutter members 22 to be moved smoothly between the close position to close the center opening 27 and the open position to open the center opening 27.

Referring to FIGS. 6. 7 and 8, the roller 65 is moved with the crank 64 in the curved guide groove 62 on the cam 60 when the crank 64 is turned about the pivot 63. When the crank 64 is turned about the pivot 63 in one direction, the first link 67 and the second link 61 are moved rightwards, causing the side roller 611 to be moved to the right end of the longitudinal sliding slot 681 in the locating plate 68, and at the same time the top roller 612 drives the guide plate 34, causing the rotary wheel 30 to be turned counter-clockwise through an angle. When the side roller 611 reaches the right end of the longitudinal sliding slot 681 in the locating plate 68, the rear protruding portion 26 of each cutter member 22 is respectively received in the triangular recesses 19 in the holder frame 10, and the center opening 27 is fully opened (see FIGS. 6 and 7), allowing the cylindrical body W to pass through the center opening 12 of the holder frame 10.

Referring to FIGS. from 11 through 14, dough crust W5 is delivered through the dough crust supply container 41 and guided by the guide rollers 45 and 46 forwardly through the tubular passage 471 within the hopper 47 around the nozzle tube 48, and at the same time the filling W1 is propelled forwards by the propelling blades 43, 44 and 45 from the filling supply container 42 through the hose 49 into the nozzle tube 48, and therefore a cylindrical body W is continuously moved out of the hopper 47 into the center opening 27. and cut into individual spherical bodies 80 by the cutter assembly 20.

When the cutter members 22 are moved toward the center of the annular wheel 30), the front cutting edge 22 of each cutter member 22 is forced into the cylindrical body W to close the center opening 27, and to simultaneously cut off the cylindrical body W. Because the front cutting edge 221 of each cutter member 22 has treads 224 and nosings 223, two stepped, tapered spaces 225 are respectively formed at top and bottom sides of the abutted front cutting edges 221 of the cutter members 22 to receive the leading part of the cut cylindrical body W and the cutting side W4 of the spherical body 80 when the cutter members 22 close the center opening 27, enabling the filling W1 to be respectively forced upwards and received inside the dough crust of the cut cylindrical body W, or forced downwards and received inside the dough crust 82 of the spherical body 80. When one spherical body 80 is produced, it falls to the conveyer 50, and the cutting side W4 is immediately disappeared due to the effect of the flexibility of the material property of the dough crust covering layer 82, and therefore the dough crust covering layer 82 is maintained in about a uniform thickness.

Referring to FIG. 17, the C-shaped fender 52 stops produced spherical bodies 80 from falling out of the conveyer 50, enabling produced spherical bodies 80 to be carried by the conveyer 50 to the spherical body collector (not shown).

Referring to FIG. 16, the metal pressure plate 181 is inserted in a slot 171 in the holder frame 10, having a bearing face 182, which supports one cutter member 22. By means of rotating the adjusting the adjustment screw 183 inwards or outwards. the contact tightness between the adjacent vertical sidewalls 21 of each two adjacent cutter members 22 of the cutter assembly 20 is relatively adjusted.

It is to be understood that the drawings are designed for purposes of illustration only, and are not intended for use as a definition of the limits and scope of the invention disclosed.

What the invention claimed is:

1. A method of shaping a spherical body consisting of a dough crust covering layer and a filling, comprising:

installing a cutter assembly having a plurality of triangular cutter members in a rotary wheel inside a holder frame, keeping said cutter members in sliding contact with each other;

driving said triangular cutter members alternatively between two positions to form a center opening and to close the center opening, enabling the rear part of each triangular cutter member to be received in a respective triangular recess in said holder frame for allowing a cylindrical body consisting of dough crust and a filling to pass through said center opening when said triangular cutter members are moved to form said center opening so that said cylindrical body is cut by said triangular cutter members to form a spherical body when said triangular cutter members are moved to close said center opening.

2. The method of claim 1, further comprising the step of forming a front cutting edge having two symmetrical, vertically spaced sets of nosings and treads on each of said triangular cutter members before installing said cutter assembly in said rotary wheel.

3. The method of claim 1, further comprising the step of forming a locating flange on at least one triangular cutter member at a bottom side and at least one sliding slot in said holder frame before installing said cutter assembly in said rotary wheel, and the step of inserting the locating flange of each triangular cutter member into the at lest one sliding slot in said holder frame for enabling said cutter assembly to be moved in said at least one sliding slot in said holder frame.

* * * * *